United States Patent
Furman et al.

(10) Patent No.: US 8,763,102 B2
(45) Date of Patent: Jun. 24, 2014

(54) SINGLE SIGN ON INFRASTRUCTURE

(75) Inventors: Michael Furman, Rishon le Zion (IL); Asaf Barkan, Kfar Saba (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1414 days.

(21) Appl. No.: 12/233,666

(22) Filed: Sep. 19, 2008

(65) Prior Publication Data

US 2010/0077469 A1  Mar. 25, 2010

(51) Int. Cl.
*G06F 21/00* (2013.01)
(52) U.S. Cl.
USPC .............................................. 726/8
(58) Field of Classification Search
USPC ................. 713/168, 150; 726/8, 5; 709/225
See application file for complete search history.

(56) References Cited

U.S. PATENT DOCUMENTS

| | | | |
|---|---|---|---|
| 7,350,229 B1* | 3/2008 | Lander | 726/8 |
| 2005/0154887 A1* | 7/2005 | Birk et al. | 713/168 |
| 2007/0240206 A1* | 10/2007 | Wu et al. | 726/8 |
| 2008/0021997 A1* | 1/2008 | Hinton | 709/225 |
| 2008/0168539 A1* | 7/2008 | Stein | 726/5 |
| 2010/0043065 A1* | 2/2010 | Bray et al. | 726/8 |

\* cited by examiner

*Primary Examiner* — Brandon Hoffman
*Assistant Examiner* — Anthony Brown (57) ABSTRACT

One embodiment is a method that uses a Single Sign On (SSO) infrastructure in an application for creating a security context that identifies a user. The application then passes the security context to a second application and to the user as a cookie. The cookie is passed back to applications to enable SSO access to resources.

13 Claims, 5 Drawing Sheets

SINGLE SIGN ON INFRASTRUCTURE

BACKGROUND

Software products assist companies in managing information technology resources (IT) resources for multiple software applications. These IT management products optimize strategic functions between technology and business and assists with such functions as managing software projects and portfolios, testing new software deployments, reducing service or repair time with customers, etc.

In environments executing multiple software applications, users login and authenticate themselves to a first application. Subsequently, the user or the first application desires to access services of another application. Since the user has already performed the login process to the first application, he or she does not want to perform another login process for the second application. A separate login for subsequent applications is time consuming and costly.

DETAILED DESCRIPTION

Exemplary embodiments in accordance with the present invention are directed to systems and methods for using a lightweight Single Sign On (SSO) infrastructure for enabling users and software applications to access multiple applications with a single login and sign-on procedure.

In one exemplary embodiment, the lightweight SSO infrastructure is bundled in a low footprint manner in each respective application. As such, the computer system does not require any additional processes or middle-tier installations to establish SSO trust between a browser and one or more applications. SSO trust is established without using a central server since the application being requested by the user actually performs the authentication of the user.

Exemplary embodiments enable Web SSO. After an application authenticates a user, the application creates a security context that includes user information, such as user identification and security data for the user such as groups, roles, attributes, etc. This security context is encrypted in a token and then transmitted to other applications. The security context and token are also transmitted to the user as a cookie. Both the user computer and the applications store the security context and token. Thereafter, the user is able to make requests to the applications without being required to login or be re-authenticated. Requests from the user include the cookie. When an application receives a user request (for example, from the user's browser), the receiving application decrypts the token, retrieves the security context, and validates the user.

Exemplary embodiments also enable Web Service SSO. After an application authenticates a user, the application creates a security context that includes user information, such as user identification and security data for the user such as groups, roles, attributes, etc. This security context is encrypted in a token and then transmitted to other applications. The security context and token are also transmitted to the user as a cookie. Thereafter, during a user request to a first application, a call is made from the first application to a second application. This call, for example, is performed using Web Services (WS) technology. Upon receiving the call, the second application decrypts the token, retrieves the security context, and validates the request of first application.

Exemplary embodiments are platform independent since applications share and store the security context for each user. Sharing in this manner eliminates the need for a central server to store authentication information or perform the authentications.

As discussed in more detail below, each application includes a SSO enforcer or filter and a SSO utility. The SSO utility creates the security token from the cookie (such as a Hyper Text Markup Language, HTTP, cookie). The SSO enforcer sits in front of the application to receive and validate tokens in incoming requests from either users or other applications. Since all applications share the same secret, the token is encrypted with the same secret key for a particular user. Users are thus not required to be re-authenticated since the first application authenticates the user for the other applications.

Figure 1:
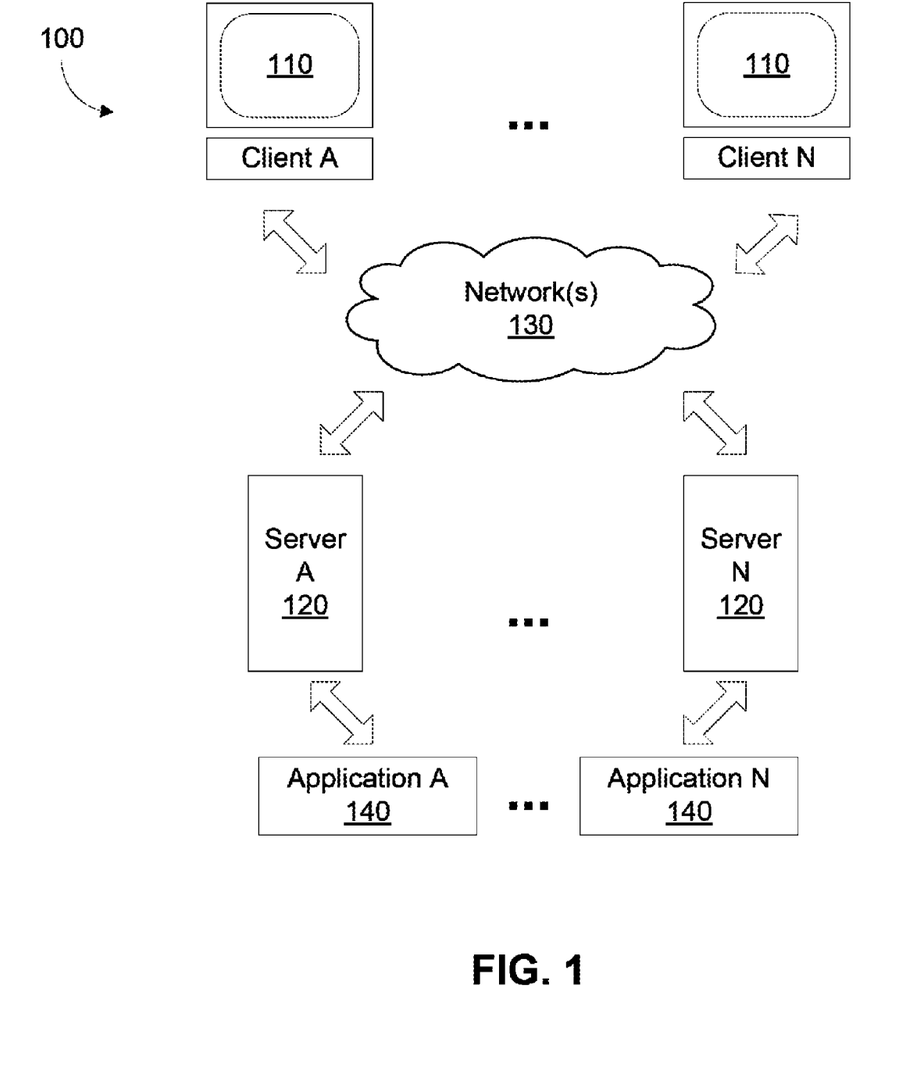
FIG. 1 is a computer system in accordance with an exemplary embodiment of the present invention.

FIG. 1 is a computer system 100 in accordance with an exemplary embodiment of the present invention. The computer system includes a plurality of client computers or users 110 (shown as client A to client N) connected to a plurality of server computers 120 (shown as server A to server N) through one or more networks 130, such as the internet and/or intranet. The servers include or execute a plurality of applications 140 (shown as application A to application N).

Exemplary embodiments can be used with independent domains, such as domains using even different operating systems. These domains can execute on a single server or multiple different servers. A client computer or user interacts and logins to a primary or first domain to establish a session with that primary domain. Thereafter, the user can invoke the services of a second domain without performing a login process to this second domain (i.e., a separate sign-on dialogue with each secondary domain is not required).

Figure 2:
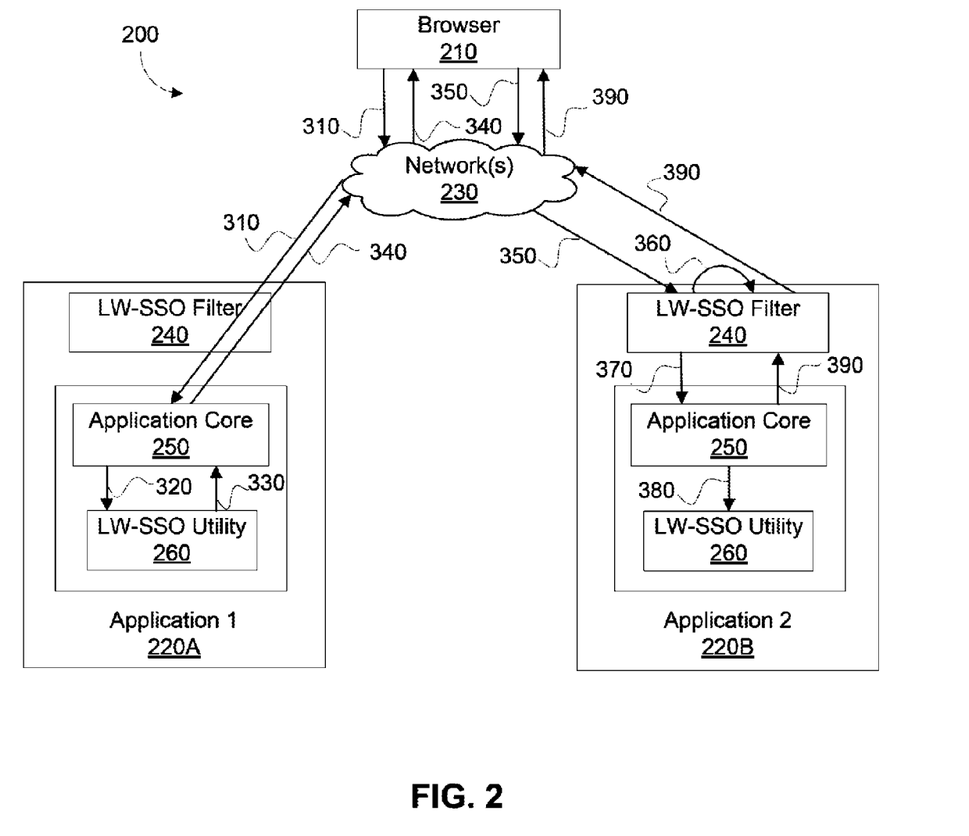
FIG. 2 shows the architecture for performing a Web Single Sign On (Web SSO) using a lightweight infrastructure in accordance with an exemplary embodiment of the present invention.

FIG. 2 shows the architecture of a system 200 for performing a Web Single Sign On (Web SSO) using a lightweight infrastructure in accordance with an exemplary embodiment of the present invention. The system includes a plurality of applications 220A and 220B in communication with a browser 210 through one or more networks 230. For simplicity of illustration, only a single browser 210 is shown, but exemplary embodiments can include many such browsers (such as client computers or users 110 shown in FIG. 1). Further, only two applications 220A and 220B are shown, but exemplary embodiments can include many such applications executing in a single server or multiple servers (such as applications 140 executing in servers 120 of FIG. 1). For example, the architecture in FIG. 2 can include one or more IT management applications and/or enterprises.

Each application 220A and 220B includes a lightweight (LW) SSO filter or enforcer 240, an application core 250, and a LW SSO utility 260.

Figure 3:
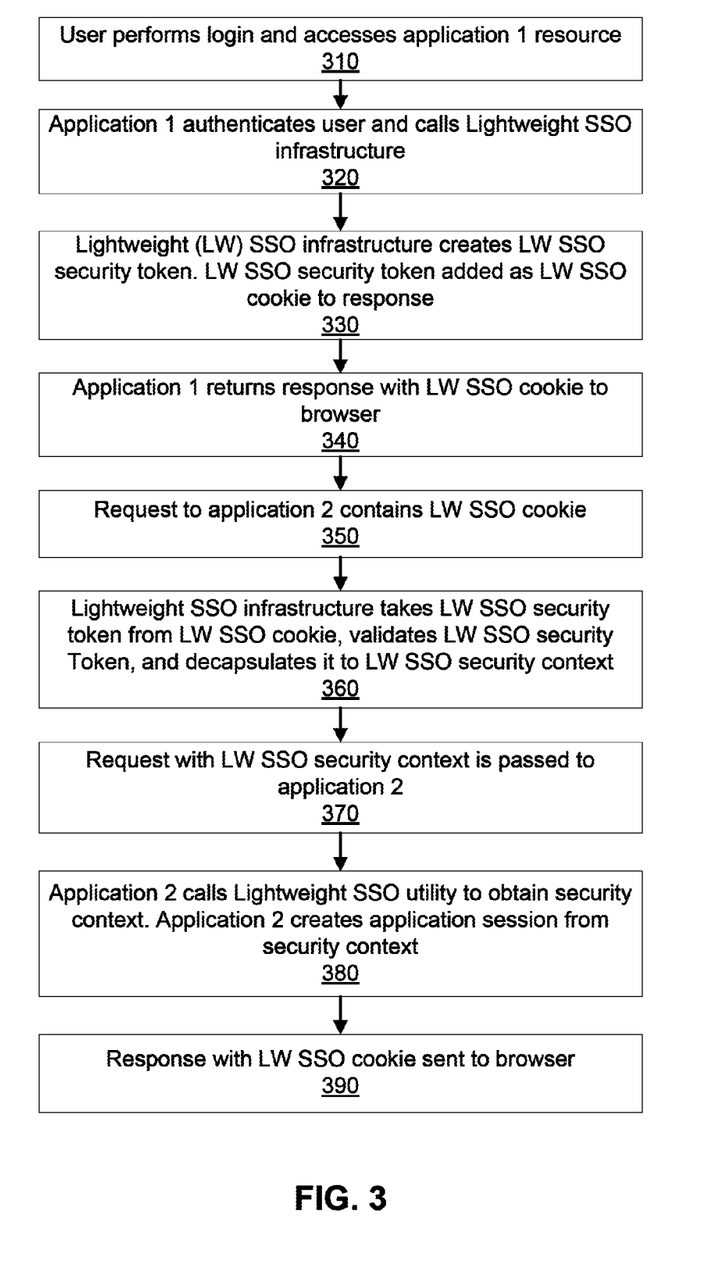
FIG. 3 is flow diagram for performing the Web Single Sign On (Web SSO) using the lightweight infrastructure in accordance with an exemplary embodiment of the present invention.

FIG. 3 is flow diagram for performing the Web Single Sign On (Web SSO) using the lightweight infrastructure in accordance with an exemplary embodiment of the present invention. FIGS. 2 and 3 are simultaneously discussed.

According to block 310, a user or client computer performs a login and accesses resources of a first application. For example, a person uses a browser 210 in a computer to transmit a username and password to application 220A (for example, the application receives an HTTP request).

According to block 320, the first application authenticates the user and calls a lightweight SSO infrastructure that is part of the application. For example, the application core 250 authenticates or validates the username and password and then calls the LW-SSO utility 260. This utility creates a security context. This security context includes the user's information and other security data, such as groups, roles, attributes, etc. for the user.

In one exemplary embodiment, the security context is encrypted to a security token and then passed to other applications (such as application 220B) and to the user (such as browser 210) in the form of a cookie. If the cookie is stolen, a hacker cannot access the user's information because the security token is encrypted.

In addition, the security token is issued with a well-defined or predetermined time expiration. As such, the ability to misappropriate or steal the security token is limited to a certain specified amount of time. Since the security token includes the self-contained security context, a second application (such as a second IT management application) does not require an additional tier to authenticate the user or obtain the user's information. When the LW SSO security token time is close to expiring, the LW SSO filter can create a new security token from the security context or disable the SSO.

In one exemplary embodiment, the security context is converted to the security token (and vise versa) and then passed from one application to another by the lightweight SSO infrastructure. The object holds the entire user related security data: username, roles, groups, and user's attributes (for example, email, customer, etc.). The security context can include both public and internal roles (or groups). In one exemplary embodiment, only public roles (or groups) are passed to the security context.

According to block 330, the security token is added as a cookie to a response. For example, the security token is added as an HTTP cookie to an HTTP response that responds to the initial user HTTP request to the application. FIG. 2 shows the LW-SSO utility 260 creating the security context and security token and passing this information to the application core 250.

According to block 340, the first application returns the response with the LW SSO cookie to the requesting browser. For example, the application core 250 returns the HTTP response with the HTTP cookie back to the browser 210.

According to block 350, the user makes a request to a second application. This request also includes the LW SSO cookie. For example, FIG. 2 shows the browser 210 making a subsequent request to the second application 220B.

According to block 360, the lightweight SSO infrastructure takes the LW SSO security token from the LW SSO cookie, validates the LW SSO security token, and decapsulates it to the LW SSO security context. For example, the incoming HTTP request is received at the LW-SSO filter or enforcer 240 of the second application 220B. This filter retrieves the security token from the HTTP cookie, validates the security token and decapsulates it into the LW SSO security context to validate the user's incoming request.

According to block 370, the incoming request with the LW SSO security context is passed or transmitted to the second application. For example, the LW-SSO filter 240 passes the security context to the application core 250.

According to block 380, the second application calls the lightweight SSO utility to obtain the security context. The second application creates the application session from this security context. For example, the application core 250 calls the LW-SSO utility 260 to get the security context.

According to block 390, a response with the lightweight SSO security token is sent to the browser for use in subsequent requests to the second application. For example, the application core 250 transmits the cookie back to the browser 210.

Figure 4:
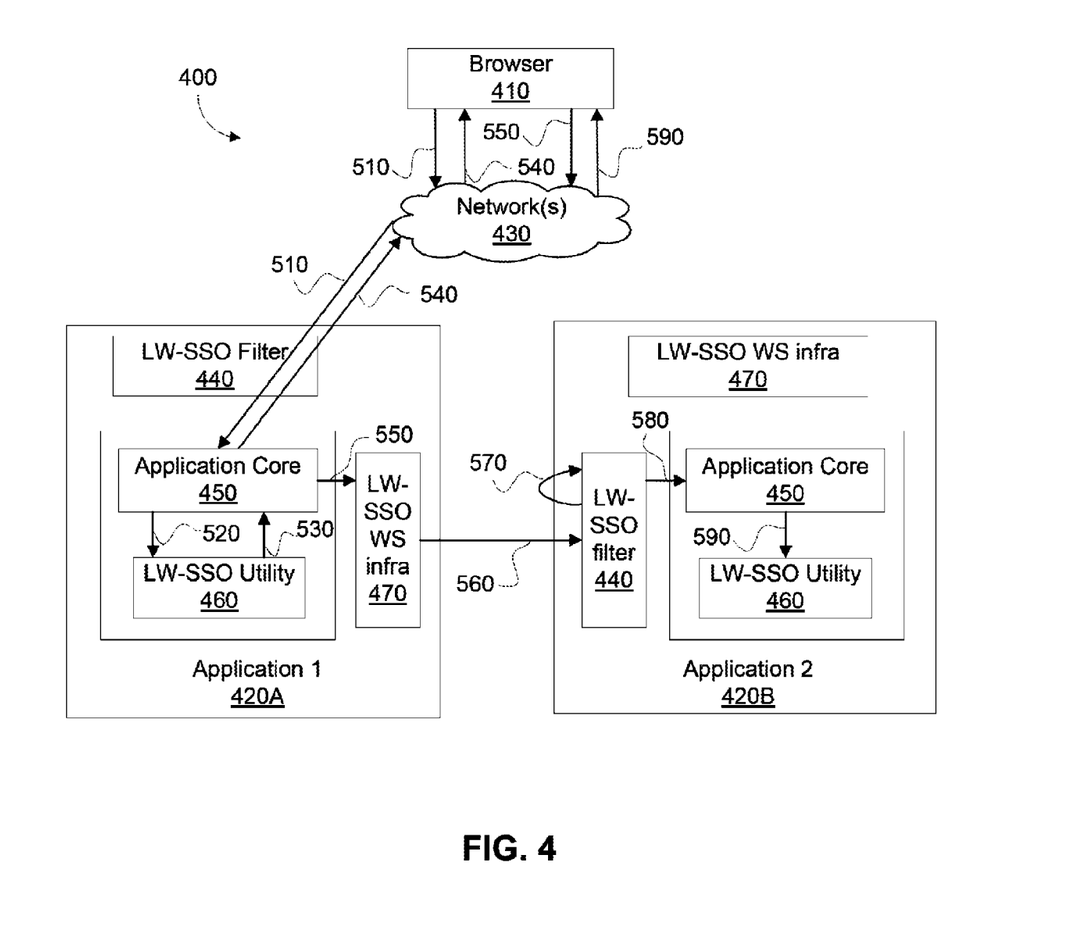
FIG. 4 shows the architecture for performing a Web Services Single Sign On (Web Services SSO) using a lightweight infrastructure in accordance with an exemplary embodiment of the present invention.

FIG. 4 shows the architecture of a system 400 for performing a Web Service Single Sign On (Web Service SSO) using a lightweight infrastructure in accordance with an exemplary embodiment of the present invention. The system includes a plurality of applications 420A and 420B in communication with a browser 410 through one or more networks 430. For simplicity of illustration, only a single browser 410 is shown, but exemplary embodiments can include many such browsers (such as client computer or users 110 shown in FIG. 1). Further, only two applications 420A and 420B are shown, but exemplary embodiments can include many such applications executing in a single or multiple servers (such as applications 140 executing in servers 120 of FIG. 1). For example, the architecture in FIG. 4 can include an IT management software application and can be included in the architecture of system 200 in FIG. 2.

Each application 420A and 420B includes a lightweight (LW) SSO filter or enforcer 440, an application core 450, a LW SSO utility 460, and a LW SSO Web Service (WS) infrastructure 470.

Figure 5:
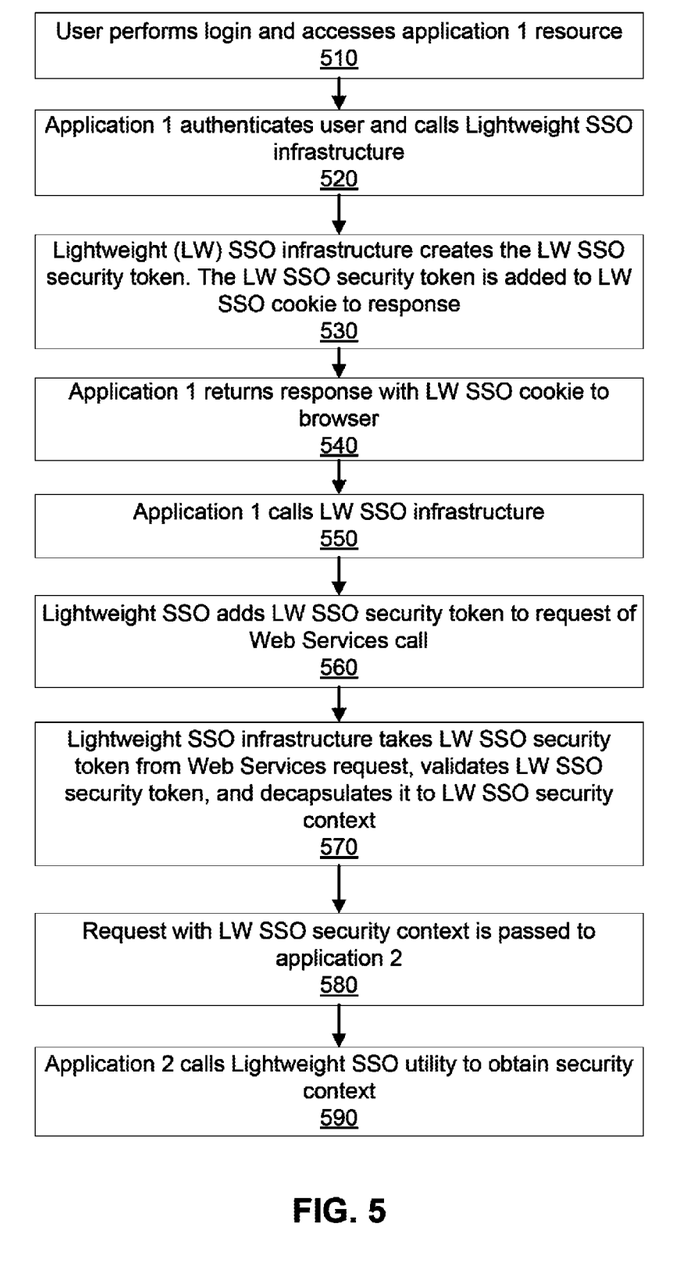
FIG. 5 is flow diagram for performing the Web Services Single Sign On (Web Services SSO) using the lightweight infrastructure in accordance with an exemplary embodiment of the present invention.

FIG. 5 is flow diagram for performing the Web Service Single Sign On (Web Service SSO) using the lightweight infrastructure in accordance with an exemplary embodiment of the present invention. FIGS. 4 and 5 are simultaneously discussed.

According to block 510, a user or client computer performs a login and accesses resources of a first application. For example, a person uses a browser 410 in a computer to transmit a username and password to application 420A (for example, the application receives an HTTP request).

According to block 520, the first application authenticates the user and calls a lightweight SSO infrastructure that is part of the application. For example, the application core 450 authenticates or validates the username and password and then calls the LW-SSO utility 460. This utility creates a security context. This security context includes the user's information and other security data, such as groups, roles, attributes, etc. for the user.

In one exemplary embodiment, the security context is encrypted to a security token and then passed to other applications (such as application 420B) and to the user (such as browser 410) in the form of a cookie. As noted above, if the cookie is stolen, a hacker cannot access the user's information because the security token is encrypted and issued with a well-defined time expiration.

According to block 530, the lightweight SSO infrastructure creates the LW SSO security token. The LW SSO security token is added to the LW SSO cookie to response. For example, the security token is added to an HTTP cookie that responds to the initial user HTTP request to the application.

FIG. 4 shows the LW-SSO utility 460 creating the security context and security token and passing this information to the application core 450.

According to block 540, the first application returns the response with the LW SSO cookie to the requesting browser. For example, the application core 450 returns the HTTP response with the HTTP cookie back to the browser 410.

According to block 550, the first application calls the LW SSO infrastructure. For example, application 420A calls LW SSO WS infrastructure 470.

According to block 560, the lightweight SSO adds the LW SSO security token to the request of the Web Services call. The security token is passed from the LW SSO WS infrastructure 470 of the first application 420A to the LW SSO filter 440 of the second application 420B.

According to block 570, the lightweight SSO infrastructure of the second or called application takes the LW SSO security token from the Web Services request, validates the LW SSO security token, and decapsulates it to the LW SSO security context. For example, the incoming HTTP request is received at the LW-SSO filter or enforcer 440. This filter retrieves the security token from the incoming call and validates the incoming request.

According to block 580, the request with the LW SSO security context is passed to the second application if the request is valid. For example, the request is passed from the LW SSO filter 440 to the application core 450.

According to block 590, the second application calls the lightweight SSO utility to obtain the security context. For example, the application core 450 calls the LW-SSO utility 460 to get the security context. The application can obtain the security context from the request itself or from the lightweight SSO infrastructure.

In a usage case for a Web Service SSO, each WS can be configured to support different combinations of security levels. The first application creates the security context and passes it to the other applications (other applications or handlers are not required to then also create the security context). As such, a single server can support different clients for the same Web Service in the same configuration.

The applications can have different responsibilities depending on whether it processes an inbound call or an outbound call. For inbound calls, the application calls to get the security context, creates a user session from the security context, and saves the security context for outbound WS calls. For outbound calls, the application obtains or creates the security context, adds to stub security context, and invokes the call.

SSO provides various benefits including, but not limited to, reduction in the time taken by users in sign-on operations to multiple domains, improved security through the reduced need for a user to handle and remember multiple sets of authentication information, improved response by system administrators in adding and removing users to the system or modifying their access rights, improved security through the enhanced ability of system administrators to maintain the integrity of user account configuration including the ability to inhibit or remove an individual user's access to all system resources in a coordinated and consistent manner, etc.

Exemplary embodiments are used with various use cases. In a first use case, two or more IT management applications exist with web access. A user logins to the first IT MANAGEMENT application and is authenticated by the application. The user subsequently desires to access a different IT management application in the same browser. The lightweight SSO infrastructure described herein allows the user to enter the second IT management application without requiring the user to interactively re-authenticate. This use case is referred to as a Web SSO.

In a second use case, two or more IT management applications exist with web access. A user logins to the first IT management application and is authenticated by the application. During a user request to the first IT management application, a Web Service call must be made to a second IT management application. The user subsequently desires to access a different IT management application in the same browser. The lightweight SSO infrastructure described herein transfers user data to the second IT management application so the call can be executed without requiring the user to interactively re-authenticate. This use case is referred to as a Web Services (WS) SSO.

In a third use case, a WS call must be executed from a first IT MANAGEMENT application to a second IT management application using information of a non-interactive user. The lightweight SSO transfers users data from the first IT MANAGEMENT application to the second IT MANAGEMENT application so the call can be executed.

With exemplary embodiments, the lightweight SSO solves Web SSO and WS SSO login and authenticate problems in a lightweight manner without installation of any additional middle tier hardware (such as a central or authentication server). For both the Web SSO and the WS SSO, the lightweight SSO infrastructure is responsible for passing encrypted and secure user information from one application to another application. As such, a user can first login to application 1 and then open a link to application 2 (or vice versa, login to application 2 and then open a link to application 1). The lightweight SSO is responsible for login, user verification, and security and is stored in or part of the application.

The lightweight SSO infrastructure offers various uses. For example, the LW-SSO does not require a change to the way applications perform authentication; LW-SSO does not require installation and management of central authentication server and database; LW-SSO supports multiple authentication servers; LW-SSO does not require to install/use/manage central user registry; LW-SSO can delegate the SSO token in cookie (application transparent approach or delegate the SSO token in specific URL application aware approach). Furthermore, LW-SSO supports multiple levels to the security of the token to allow trade between performance and security in configuration; LW-SSO is designed to support both HTTP based UI (User Interface) launching SSO and Web services SSO as well in the same architecture; LW-SSO supports DRM (Dynamic Roles Mapping) mechanism in multiple different alternatives; LW-SSO help applications to abstract integration with IdM (Identity Management); and LW-SSO supports multiple authentication tokens in both UI and web service for different secure environments.

Embodiments in accordance with the present invention are not limited to any particular type or number of computers and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

DEFINITIONS

As used herein and in the claims, the following words are defined as follows:

The term "IT management application" is an enterprise software product that assists companies in managing information technology (IT) resources for multiple software applications. These applications optimize strategic functions between technology and business and assist with such functions as managing software projects and portfolios, testing new software deployments, reducing service or repair time with customers, etc.

The word "cookie" means information or data sent by a server or application to a web browser and then returned from the web browser to the server or application in requests to the server or application. For example, HTTP cookies are used to authenticate, track, or maintain specific information about users. Cookies enable a server or application to differentiate between users and know whether a user is already authenticated.

The term "security token" or "token" means a type of two-factor authentication security device or software object that is used to authorize use of computer services or an application. The token is stored as credentials on a hardware device.

The term "Single Sign On" or "SSO" means a method of access control that enables a user to be authenticated once and then gain access to resources of multiple software systems. With SSO, users login or sign-in a single time and thus eliminate the need to sign-in multiple times (each of which could involve different usernames and passwords). For example, a user enters in a single time a username and password to logon to multiple applications within an enterprise or between enterprises (for example, enterprises using federated authentication).

The term "Web Service" or "WS" means a software system that supports interoperable machine to machine or computer to computer interaction over a network. For example, client computers communicate with servers using XML (Extensible Markup Language) messages that follow SOAP (Simple Object Access Protocol) standards.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method executed by a computer, comprising: authenticating, by the computer, a user at an application;
    calling, by the computer, a Single Sign On (SSO) infrastructure in the application for creating a security context that identifies the user;
    passing, by the computer, the security context from the application to a second application and to the user as a cookie; and
    calling, by the computer, a SSO infrastructure in the second application to authenticate a request that includes the cookie from the user;
    wherein the SSO filter of the second application decrypts an encrypted token in the cookie from a web service (WS) call received from the application to obtain a security context for the user that initiates HTTP (Hyper Text Markup Language) requests to the second application.

2. The method of claim 1 further comprising: encrypting, with the SSO infrastructure in the application, the security context to create the token that is passed in the cookie to the user and passed to the SSO infrastructure of the second application.

3. The method of claim 1 further comprising, placing an expiration time limit on the security context to limit ability of a hacker to use the security context.

4. The method of claim 1 further comprising:
    creating an application session at the second application with the security context; and
    passing the security context in a cookie from the second application to a browser of the user for use in a subsequent request from the browser to the second application.

5. The method of claim 1 further comprising, enabling the user to be authenticated only once at the application using a single sign on process to gain access to multiple different applications in an enterprise.

6. A tangible non-transitory computer readable storage medium having instructions, that when executed, cause a computer:

authenticate a user at an application that includes Single Sign On (SSO) infrastructure in the application for creating a security context that identifies the user;

pass the security context in a cookie from the application to a browser of the user and to a second application;

perform a Web Service (WS) call that includes the security context from the application to the second application;

use a SSO infrastructure in the second application to retrieve the security context from the WS call, validate the WS call, and respond to the WS call;

create an application session at the second application with the security context; and pass the security context in a cookie from the second application to the browser of the user for use in a subsequent request from the browser to the second application, wherein the SSO filter of the second application decrypts an encrypted token in the cookie from a web service (WS) call received from the application to obtain a security context for the user that initiates HTTP (Hyper Text Markup Language) requests to the second application.

7. The tangible non-transitory computer readable storage medium of claim 6 comprising instructions that cause the computer to: receive, at the second application and from the browser of the user, the subsequent request that includes the cookie sent from the second application to the browser of the user.

8. The tangible non-transitory computer readable storage medium of claim 6, wherein the first and second applications share a same secret to validate the browser of the user.

9. The tangible non-transitory computer readable storage medium of claim 6 comprising instructions that cause the computer to, store the security context in an encrypted token in both the application and in the second application.

10. The tangible non-transitory computer readable storage medium of claim 6, wherein the application authenticates the user for the second application so the user is not required to be re-authenticated at the second application.

11. A computer system, comprising: one or more servers;
a first software application executing on the one or more servers and including a Single Sign On (SSO) filter, a SSO utility, and an application core; and a second software application executing on the one or more servers and including a SSO filter, a SSO utility, and an application core, wherein the first and second applications communicate to enable both Web SSO and Web Services SSO, and wherein the first software application transmits over a network an encrypted token in a cookie to a browser so a user can transmit the encrypted token and the cookie back to the first software application and to the second software application to access resources of the first software application and the second software application in a SSO session, wherein the SSO utility of the first software application creates a security context from user login information and from security data that includes groups, roles, and attributes for the user, and the wherein the SSO filter of the second software application decrypts the encrypted token from a WS call.

12. The computer system of claim 11, wherein the SSO filter of the second software application decrypts the encrypted token from a WS call received from the first software application to obtain a security context for the user that initiates HTTP (Hyper Text Markup Language) requests to the second software application.

13. The computer system of claim 11, wherein the first software application transfers user data to the second software application so a WS call from the first software application to the second software application can be executed without requiring the user to be re-authenticated.

* * * * *